3,088,972
Patented May 7, 1963

3,088,972
PHENOTHIAZINE AS A STABILIZER IN VINYL-ARYL SULFONATES
Leonard A. Mattano and Charles E. Grabiel, Midland, Mich., assignors to The Dow Chemical Company, Midland, Mich., a corporation of Delaware
No Drawing. Filed May 27, 1960, Ser. No. 32,136
4 Claims. (Cl. 260—505)

This invention relates to stabilized compositions of vinyl-aryl sulfonic acids and salts thereof. More particularly, it concerns inhibiting such monomers against premature polymerization by the addition thereto of a small quantity of phenothiazine.

Vinyl-aryl sulfonic acids and salts thereof are subject to polymerization induced by natural peroxides formed within the monomers or solutions thereof by absorbed oxygen. The usefulness of the monomers or their effectiveness in desired polymerization or copolymerization reactions can thus be reduced or completely destroyed. Though protective measures taken during the manufacture of these monomers to minimize polymerization are effective in maintaining monomer losses due to peroxide-induced polymerization at relatively low levels, more efficient means of preventing such losses are desirable. Monomer losses that occur storage as a result of such polymerization also must be prevented in order to provide time for handling that is necessary in commercial utilization.

It is the principal object of this invention to provide inhibited monomer compositions of vinyl-aryl sulfonic acids and salts thereof which are stable against monomer losses or polymerization that is induced by naturally occurring peroxides. Other objects will become apparent as the invention is hereinafter more fully described.

In accordance with the present invention, it has been discovered that a stabilized monomer composition of a vinyl-aryl sulfonic acid or salt thereof can be prepared by incorporating a small quantity of phenothiazine into the monomer composition at any one of the several convenient stages in its preparation and utilization.

Vinyl-aryl sulfonic acids or salts thereof that can be stabilized in accordance with the present invention include those for which preparative methods are taught in Mock, United States Letters Patent 2,821,549. Specifically, the monomers contemplated by the present invention are styrene sulfonic acids, vinyl-naphthalene sulfonic acids, the alkali metal, alkaline earth metal and ammonium salts thereof and the halo and the alkyl substituted derivatives thereof. Exemplary compounds are sodium styrene sulfonate, potassium styrene sulfonate, lithium styrene sulfonate, ammonium styrene sulfonate, calcium styrene sulfonate, barium styrene sulfonate, sodium vinyl-chlorobenzene sulfonate, sodium vinyl-bromobenzene sulfonate, potassium vinyltoluene sulfonate, potassium vinylmesitylene sulfonate, sodium vinylxylene sulfonate, sodium vinyl-ethylbenzene sulfonate, sodium vinyl-diethylbenzene sulfonate, potassium vinyl-chlorotoluene sulfonate, potassium vinylnaphthalene sulfonate, sodium vinyl-chloronaphthalene sulfonate, sodium vinyl-dichloronaphthalene sulfonate, potassium vinyl-methylnaphthalene sulfonate and the like substituted and unsubstituted vinyl-aryl sulfonates.

Preferably, the phenothiazine is added to the vinyl-aryl sulfonic acid or salt thereof during its manufacture or shortly thereafter. Highly satisfactory results are obtained by incorporating the phenothiazine into the haloethyl substituted aryl sulfonic acids of Mock supra, just prior to the dehydrohalogenation step. Subsequently, it may be desirable to add this inhibitor to the monomer after it has been purified by recrystallization which process may have removed some portion of the initially available inhibitor or it may be desirable to make incremental additions of the phenothiazine inhibitor, especially in aqueous solutions of the monomer after long periods of storage.

The present invention concerns in addition to phenothiazine such other materials equivalent thereto as the alkyl- and halo-substituted derivatives of phenothiazine. The amount of phenothiazine that can be employed effectively in the present invention varies from about 0.0005 to about 0.3 percent of the vinyl-aryl sulfonate monomer and preferably the amount employed is from about 0.01 to about 0.03 percent of the monomer, the percentages being based on the weight of the monomer.

By way of further illustration of the present invention, equal quantities of aqueous solutions containing about 10 percent of β-bromoethylbenzene sulfonic acid which had been prepared in accordance with the method of Mock supra, were charged to identical flasks equipped with means for regulating the temperature therein. A sufficient amount of the inhibitor was added to one flask to provide a phenothiazine concentration of 0.03 percent based on the weight of the β-bromoethylbenzene sulfonic acid. Sodium hydroxide was added to each flask in an amount in excess of the stoichiometric requirement for the dehydrohalogenation of β-bromoethylbenzene sulfonic acid. The contents of each flask were heated up to about 90° C. in the absence of oxygen for about 30 minutes to accomplish dehydrobromination of the β-bromoethylbenzene sulfonic acid. On completion of the reaction, the resulting product mixture was analyzed and a sodium styrene sulfonate monomer to sodium bromide molar ratio obtained for each mixture. Theoretically, such a ratio would have a value of 1.0 if all the β-bromoethylbenzene sulfonic acid had been converted to unpolymerized sodium styrene sulfonate. Lesser ratios indicate increasing amounts of polymer formation with a corresponding loss in monomer concentration. The phenothiazine-containing composition had a monomer/sodium bromide ratio of 0.923 while that for the untreated monomer composition was less than 0.8 indicating polymerization and resulting monomer loss. The inhibited monomer composition remained stable, i.e., substantially unpolymerized, for a period in excess of several months.

In order to further demonstrate the exceptional and surprising efficiency of phenothiazine as a polymerization inhibitor in aqueous solutions of vinyl-aryl sulfonic acid or salts thereof, quantities of a material containing 96.6 percent sodium styrene sulfonate, known to contain natural peroxides as the result of the absorption of oxygen, were mixed with sufficient water to provide 30 percent solutions of the sodium styrene sulfonate. To one solution was added 0.03 weight percent phenothiazine and to a second solution was added 0.2 weight percent sodium nitrite. Sodium nitrite is the stabilizer taught by Estes in United States Letters Patent 2,822,385. A third solution was run as a blank without any inhibitor. The solutions thus prepared were subjected to a recrystallization procedure which involved heating them to a temperature from about 65° to 70° C. on a steam bath for a period of time sufficient to completely dissolve the sodium styrene sulfonate and filtering the solution to remove any insoluble residue. The filtered solutions of the sodium styrene sulfonate were then cooled to promote recrystallization of the monomer.

It was found that the untreated sodium styrene sulfonate solution polymerized during the filtering process preventing completion of the same. The phenothiazine-treated solution filtered rapidly and remained unpolymerized after filtration for a period in excess of 48 hours while the sodium-nitrite-treated solution polymerized in a manner similar to that of the control solution during filtration. Additional solutions of the above peroxide-containing sodium styrene sulfonate treated with 0.3 and 0.4 percent sodium nitrite were also tested in the above procedure. The 0.3 percent solution was polymerized during filtration while that containing 0.4 percent sodium nitrite filtered rapidly in a manner similar to that of the phenothiazine solution but started to polymerize shortly after filtration.

It was found in subsequent recrystallization experiments that concentrations of as little as 0.0005 percent phenothiazine were effective in preventing polymerization but at such low concentrations, the subsequent period of stability or storage life of the inhibited styrene sulfonate is substantially less than that for sodium styrene sulfonate treated with at least 0.03 percent phenothiazine which is sufficient to prevent monomer loss for a period of many months.

In further operations similar to the foregoing, phenothiazine is added to other vinyl-aryl sulfonic acids and salts thereof such as sodium styrene sulfonate, potassium styrene sulfonate, lithium styrene sulfonate, ammonium styrene sulfonate, calcium styrene sulfonate, barium styrene sulfonate, sodium vinyl-chlorobenzene sulfonate, sodium vinyl-bromobenzene sulfonate, potassium vinyl-toluene sulfonate, sodium vinyltoluene sulfonate, potassium vinylmesitylene sulfonate, sodium vinylxylene sulfonate, sodium vinyl-ethylbenzene sulfonate, sodium vinyl-diethylbenzene sulfonate, potassium vinyl-chlorotoluene sulfonate, potassium vinyl-naphthalene sulfonate, sodium vinyl-chloronaphthalene sulfonate, sodium vinyl-dichloronaphthalene sulfonate, potassium vinyl-methyl-naphthalene sulfonate and the like substituted and un-substituted vinyl-aryl sulfonates to achieve similarly effective stabilization thereof.

We claim:

1. A composition of matter comprising a monomer selected from the group consisting of styrene sulfonic acid and vinyl naphthalene sulfonic acid, their alkali metal, alkaline earth metal and ammonium salts and chloro, bromo, methyl and ethyl ring substituted derivatives of such acids and salts; and from about 0.005 to about 0.3 percent of phenothiazine based on the weight of the monomer.

2. A composition of matter comprising sodium styrene sulfonate and from about 0.0005 to about 0.3 percent of phenothiazine based on the weight of the sodium styrene sulfonate.

3. A composition of matter comprising potassium styrene sulfonate and from about 0.005 to about 0.3 percent of phenothiazine based on the weight of the potassium styrene sulfonate.

4. A composition of matter comprising an aqueous solution of an alkali metal styrene sulfonate and from about 0.0005 to about 0.3 percent of phenothiazine based on the weight of the alkali metal styrene sulfonate.

No references cited.

UNITED STATES PATENT OFFICE
CERTIFICATE OF CORRECTION

Patent No. 3,088,972                                May 7, 1963

Leonard A. Mattano et al.

It is hereby certified that error appears in the above numbered patent requiring correction and that the said Letters Patent should read as corrected below.

Column 1, line 26, after "occur" insert -- during --; line 50, after "alkyl" insert -- ring --; column 4, lines 13 and 21, for "0.005", each occurrence, read -- 0.0005 --.

Signed and sealed this 7th day of January 1964.

(SEAL)
Attest:

ERNEST W. SWIDER
Attesting Officer

EDWIN L. REYNOLDS
Acting Commissioner of Patents